US005622326A

United States Patent [19]
Taguchi

[11] Patent Number: 5,622,326
[45] Date of Patent: Apr. 22, 1997

[54] DUSTPROOFING RIB STRUCTURE OF TAPE CASSETTE WITH LID

[75] Inventor: Osamu Taguchi, Miyagi, Japan

[73] Assignee: Sony Corporation, Tokyo, Japan

[21] Appl. No.: 541,730

[22] Filed: Oct. 10, 1995

[30]   Foreign Application Priority Data

Oct. 11, 1994  [JP]  Japan .................................. 6-245220

[51] Int. Cl.⁶ ............................................... G11B 23/087
[52] U.S. Cl. ........................................ 242/344; 242/347.1
[58] Field of Search ............................... 242/344, 347.1; 360/132

[56]        References Cited

U.S. PATENT DOCUMENTS

| 4,591,936 | 5/1986 | Kikuya et al. | 242/347.1 |
| 4,993,661 | 2/1991 | Tollefson | 242/344 |
| 5,198,951 | 3/1993 | Fujii | 242/347.1 |
| 5,295,637 | 3/1994 | Takeda et al. | 242/347.1 |
| 5,351,910 | 10/1994 | Hara | 242/342 |
| 5,475,555 | 12/1995 | Iwano et al. | 242/344 |

FOREIGN PATENT DOCUMENTS

| A-0286355 | 12/1988 | European Pat. Off. . | |
| A-0316178 | 5/1989 | European Pat. Off. . | |
| A-0311089 | 12/1989 | European Pat. Off. . | |
| 58-60475 | 4/1983 | Japan | 360/132 |
| 58-164066 | 9/1983 | Japan | 360/132 |
| 61-233484 | 10/1986 | Japan | 360/132 |
| 4-248178 | 9/1992 | Japan | 360/132 |

Primary Examiner—John P. Darling
Attorney, Agent, or Firm—William S. Frommer; Alvin Sinderbrand

[57]        ABSTRACT

A tape cassette with a pivotal lid having a tape wound on reels inside a cassette made up of upper and lower shells and light holes in the sides of the cassette for detecting the ends of the tape using light beams is made easy to assemble by dustproofing ribs for preventing dust and the like from entering through the light holes each being split into two dustproofing rib parts, one of these parts being provided on the pivotal lid and the other being provided on the lower shell. The dustproofing rib parts are so disposed that with the pivotal lid in an open position the upper shell can be assembled to the lower shell easily in one straight-line movement without its direction being changed. Facing surfaces of the two dustproofing rib parts constituting each dustproofing rib are sloping or stepped to effectively prevent dust from passing between the dustproofing rib parts.

6 Claims, 8 Drawing Sheets

5,622,326

DUSTPROOFING RIB STRUCTURE OF TAPE CASSETTE WITH LID

BACKGROUND OF THE INVENTION

This invention relates to an improvement to a tape cassette with a lid for recording and playback which makes it easy to carry out assembly of the tape cassette and particularly relates to a structure with which when fitting an upper shell with a lid mechanism assembled thereto in an open state onto a lower shell it is possible to fit the upper shell onto the lower shell from above the lower shell with one straight movement.

A lid part h of the kind shown in FIG. 2 is mounted on this kind of cassette having light beam transmission apertures b for detecting the ends of the tape. This lid part h has a pair of side portions i at its ends. These side portions i each have a shaft portion, and the lid part h is mounted on the cassette proper a pivotally about these shaft portions j between an open position wherein it exposes the tape c and a closed position wherein it covers the tape c.

Although not shown in the drawings, these side portions i are provided with openings which when the lid part h is in its open position are aligned with the light beam transmission apertures b in the cassette proper a and allow light beam f to pass from the light source e to the sensors g.

When the lid part h is in its closed position these openings are not aligned with the light transmission apertures b and dust from outside is prevented from entering through the transmission apertures b.

Even when this lid part h is in its closed position with respect to the cassette proper a, there is a gap k between the area of the cassette proper a around each light beam transmission aperture b and the lid part h. Because of this there has been the problem that even when the lid part h is in its closed state dust enters the cassette proper a through the gap k and the transmission apertures b and adheres to and adversely affects the tape c.

SUMMARY OF THE INVENTION

In this invention, dustproofing ribs for preventing the entry of dust between the side portions of the lid part and the areas around the light beam transmission apertures in the cassette proper are provided, and so that when the lid part is being assembled to the cassette proper these dustproofing ribs do not constitute an obstruction the dustproofing ribs are each divided into two rib parts and one of these rib parts is disposed on the lid part side and the other is disposed on the cassette proper side.

Also, in the invention the rib parts of the two-part dustproofing ribs are so disposed that the rib part disposed on the cassette proper side is not positioned in the locus of movement described by the rib part disposed on the lid part when the lid part opens and closes.

Furthermore, in the invention the rib parts of the dustproofing ribs have a labyrinth structure of sloping surfaces or the like to make it difficult for dust to enter.

DETAILED DESCRIPTION OF THE PREFERRED EMBODIMENTS

Figure 1:
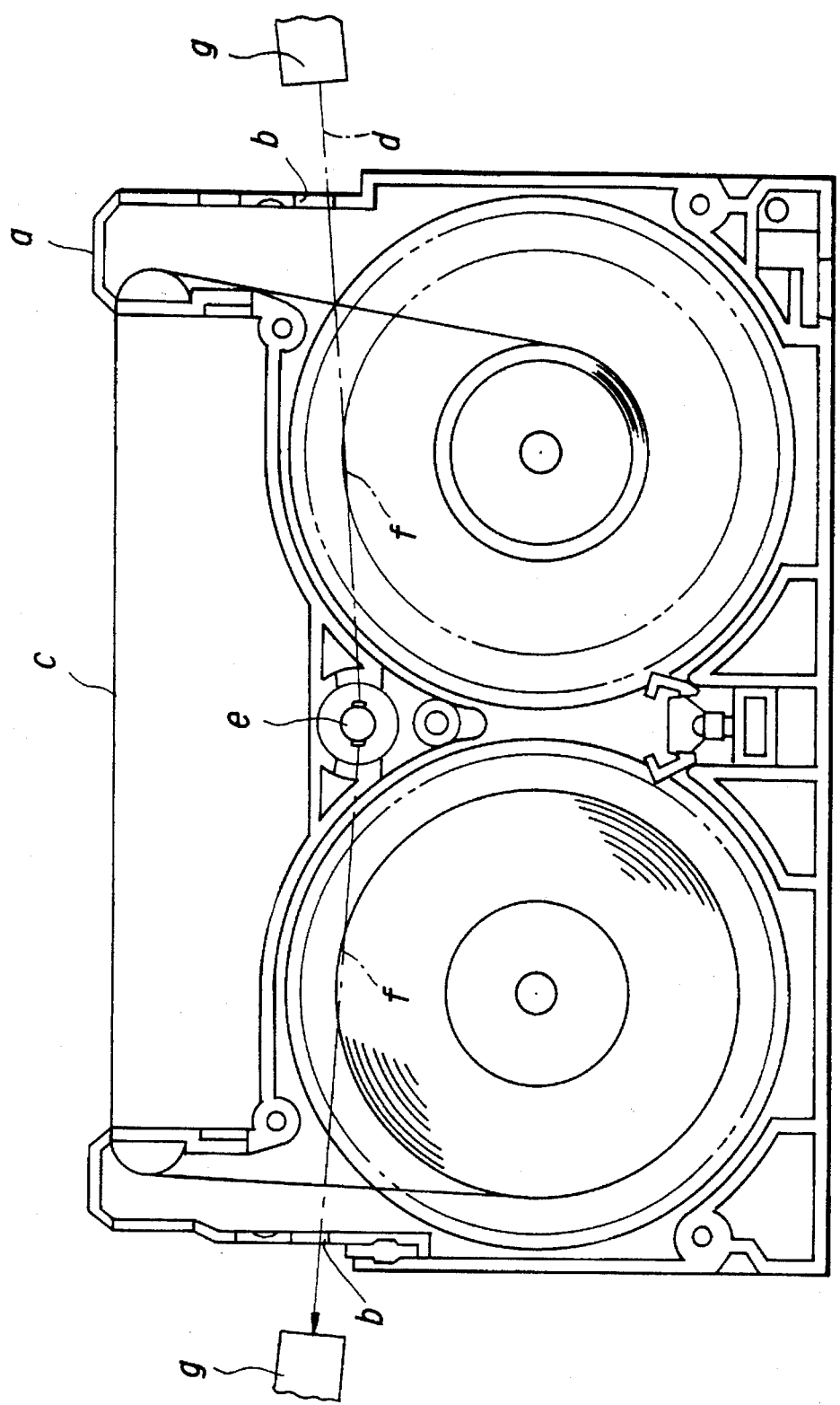
FIG. 1 is a view illustrating a cassette in the prior art.
Figure 2:
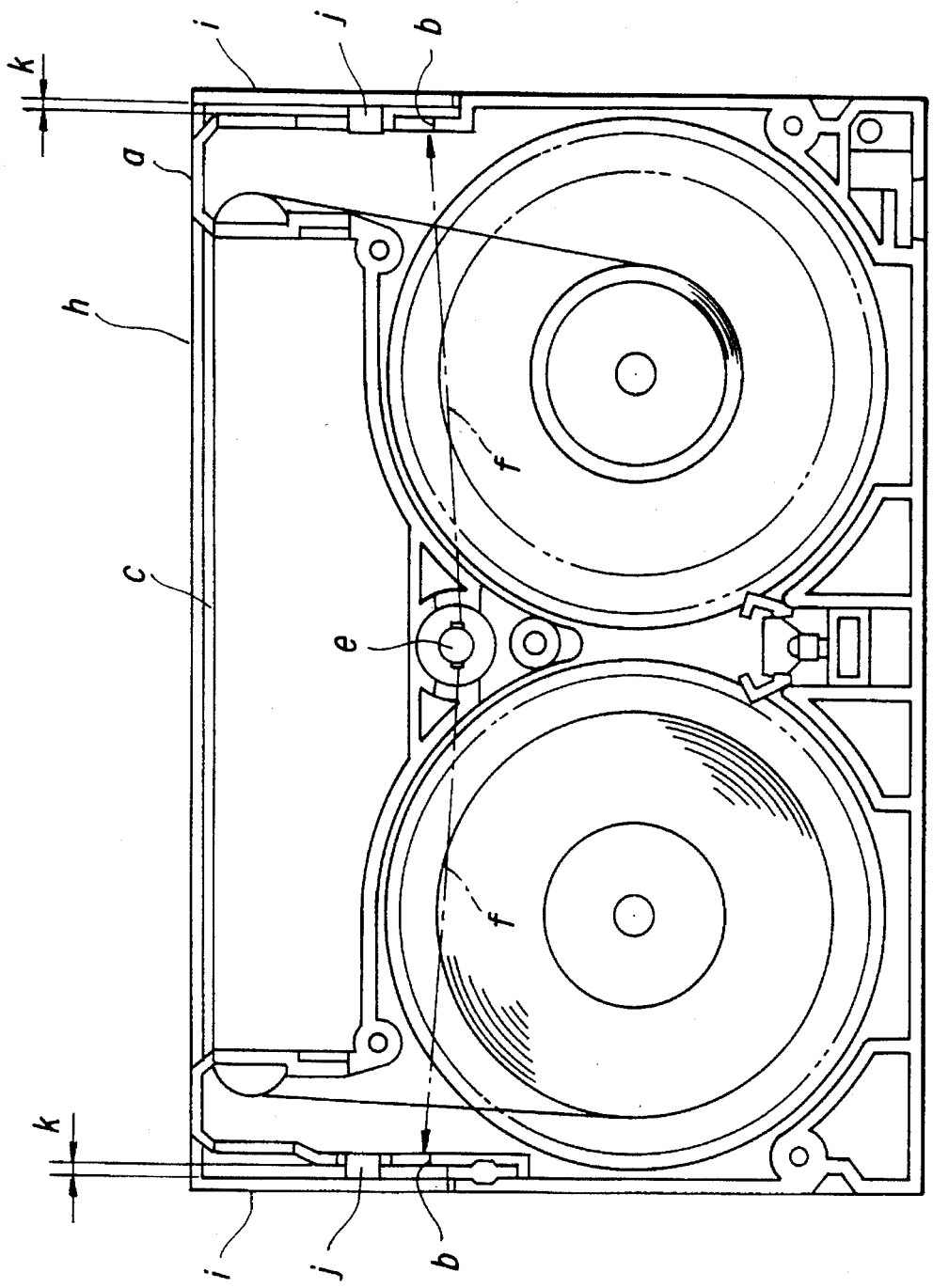
FIG. 2 is a view illustrating a cassette fitted with a lid in the prior art.
Figure 3:
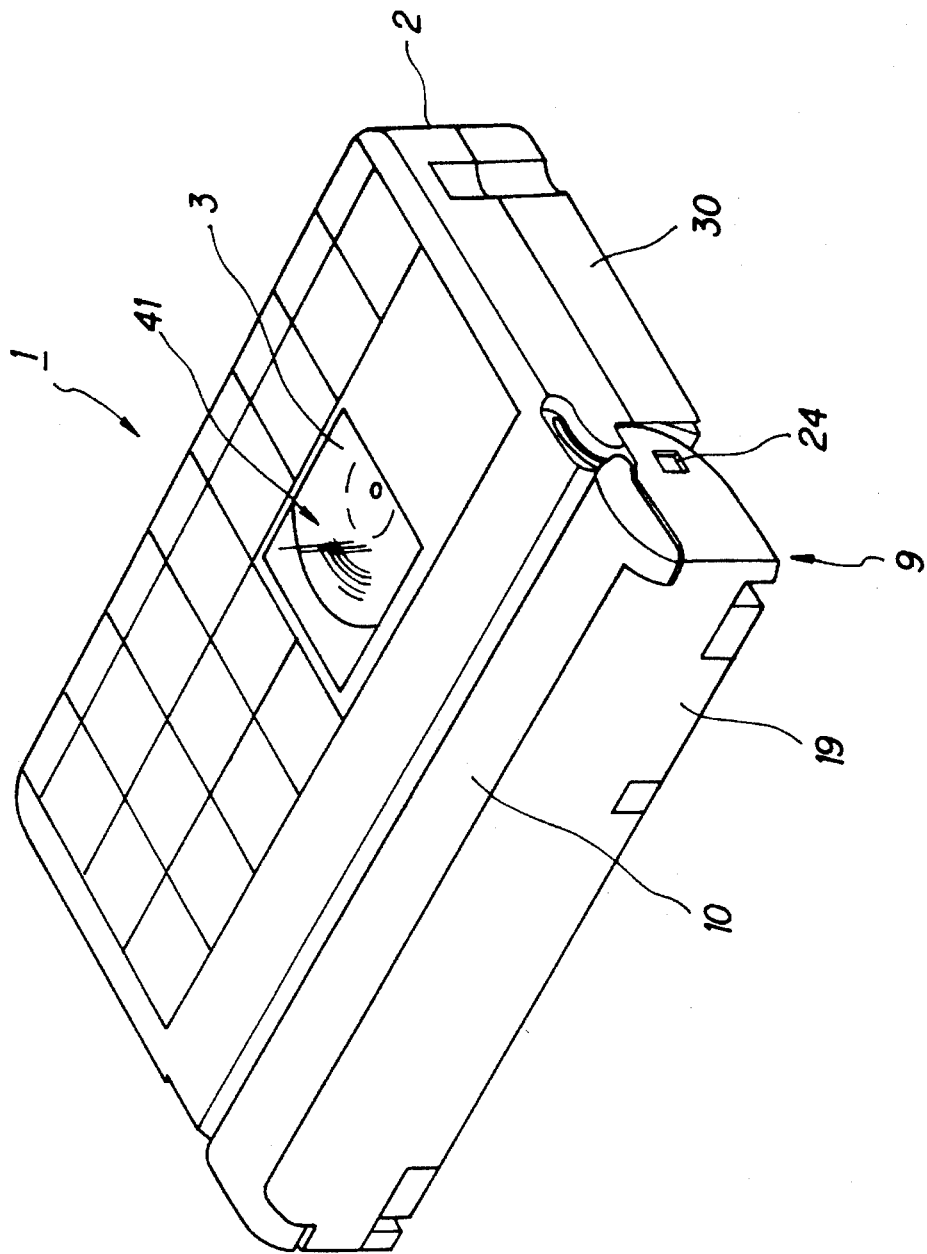
FIG. 3 is a perspective view showing the whole of a cassette with lid according to the invention.
Figure 4:
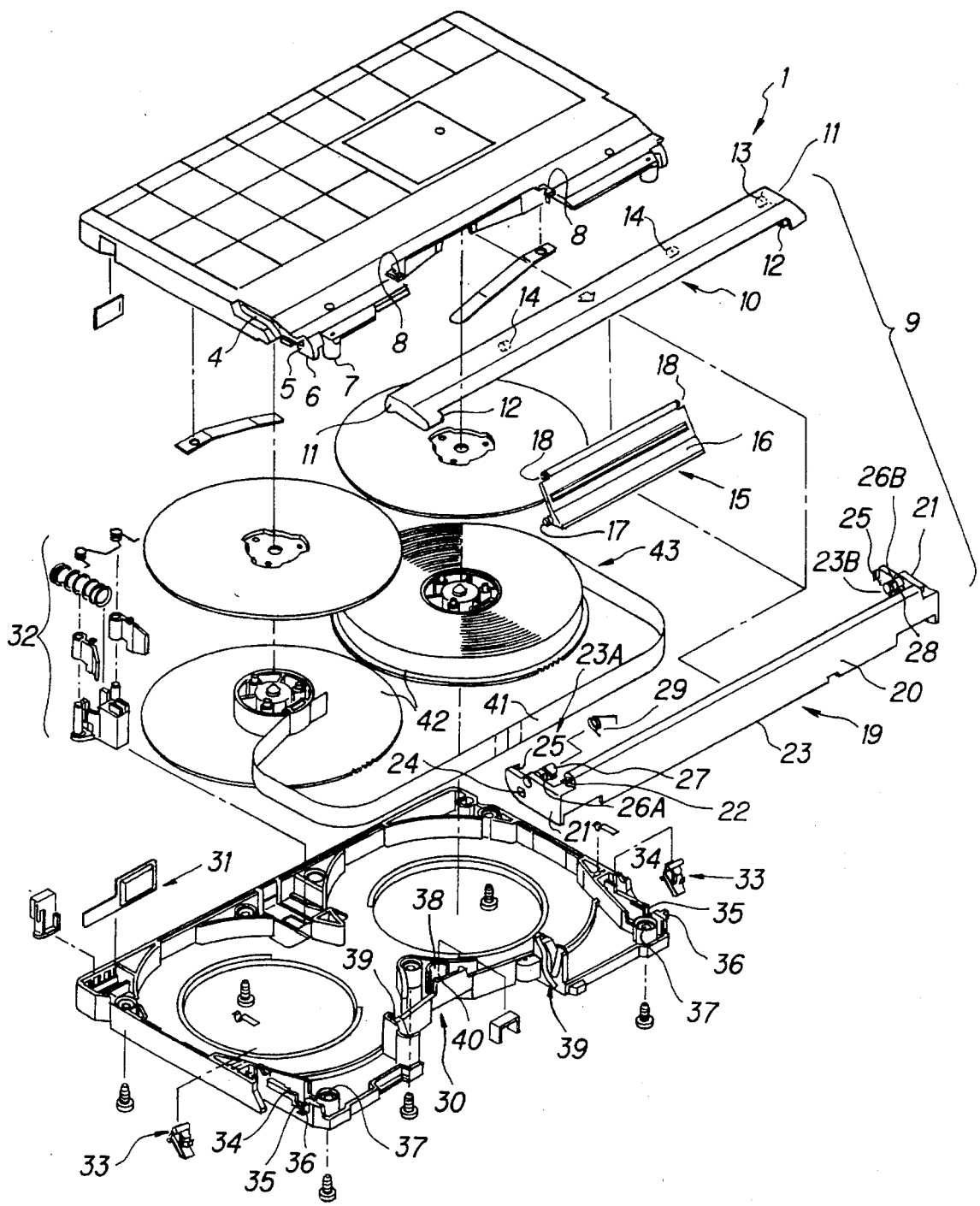
FIG. 4 is an exploded perspective view of the same cassette with lid.

As shown in FIG. 3 and FIG. 4, a cassette 1 with lid for recording and playback is rectangular and is made up of an upper shell 2, an upwardly pivotal lid mechanism 9 mounted on the front of the cassette 1 and having light path holes 24 for allowing a light path to pass therethrough, a reel part 43 inside the cassette 1 comprising a pair of tape reels 42 on which is wound a tape 41 for recording and playback and a lower shell 30.

When this cassette 1 with lid for recording and playback is not being used, a part of the tape 41 which is exposed to the outside of the upper and lower shells 2 and 30 at the front thereof is covered by the lid mechanism 9 and the magnetic tape itself is thereby protected. When the cassette 1 is used, the lid mechanism 9 is pivoted upward and thereby opened to expose the magnetic tape 41 to the outside, whereupon it is possible to detect light through the light path holes 24 of the lid mechanism 9 and thereby detect transparent and portions of the tape 41.

As shown in FIG. 4, the upper shell 2 consists of a substantially rectangular insulating member made of resin or the like and comprises a rectangular transparent window part 3 in a central portion thereof where the pair of tape reels 42 are housed so that the movement of the reels can be easily seen. At both ends of the upper shell 2 there are provided a top lid guide groove 4 formed from the front of the upper shell 2 toward the rear thereof and a front lid pivot shaft receiving part 5 cutaway in a semicircular shape in a position near this top lid guide groove 4. The upper shell also has at each end thereof a projecting portion 6 for engaging with the lower shell 30 and forming a part of a light path and a cylindrically projecting lower shell engaging projection 7 having a screw hole in its central portion, and has in a central position of the front thereof a predetermined distance apart a pair of tonguelike back lid engaging portions 8 having cutaway central portions for restraining a back lid 15.

As shown in FIG. 4, the lid mechanism 9 opens and exposes the tape 41 which is guided into a recording and playback mechanism when the cassette 1 with lid for recording and playback is loaded into an electrical appliance, for example a digital VTR or the like, and is made up of a top lid 10, the back lid 15, a front lid 19 and a twist coil spring 29 which is an elastic member for urging the lid mechanism 9 to close.

Figure 7:
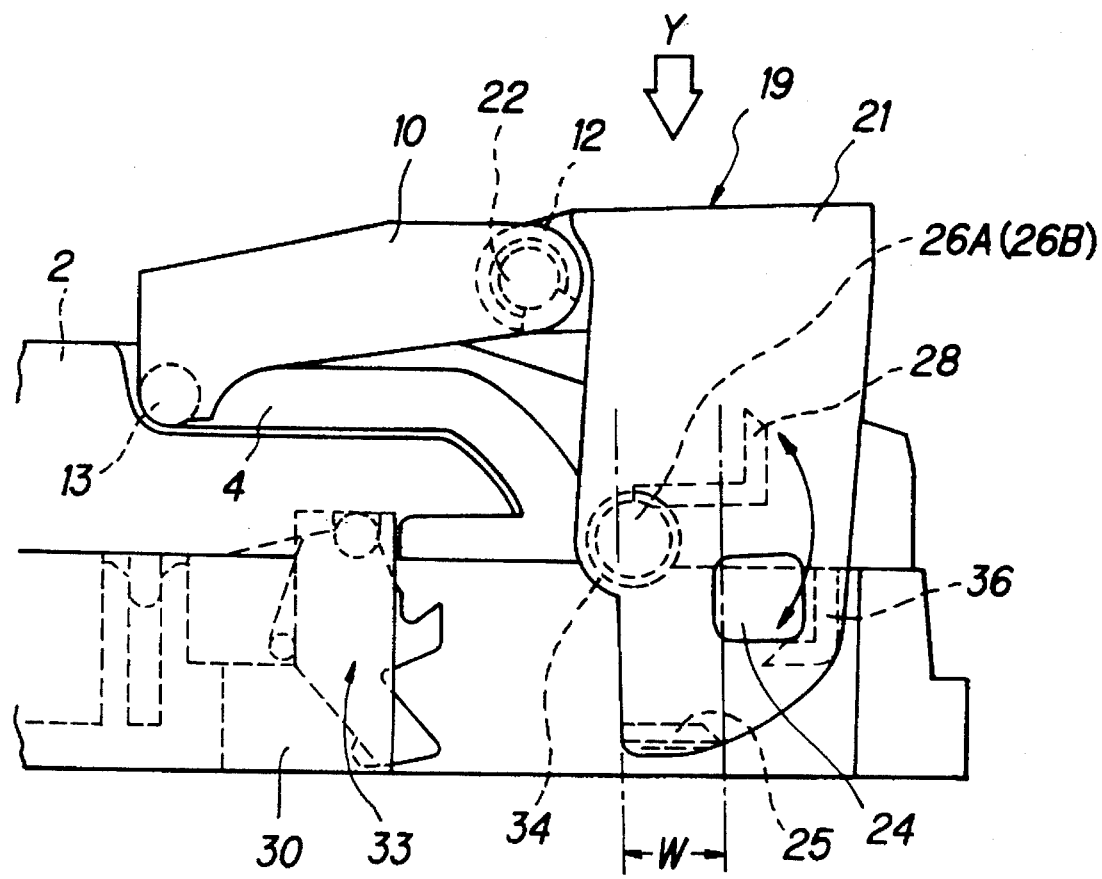
FIG. 7 is a view illustrating main parts of the lid mechanism in the open state.

The top lid 10, as shown in FIG. 4 and mainly FIG. 7, is made up of rectangular side walls 11 at both ends thereof, front lid engaging holes 12 consisting of partially cutaway concave portions formed facing each other inwardly in these side walls 11, upper shell engaging projecting portions 13 at the opposite ends of the side walls 11 to the front lid engaging holes 12 and guided by the top lid guide grooves 4 of the upper shell 2, and back lid supporting portions 14 for engaging with and supporting the back lid 15 formed at a predetermined spacing inward of the side walls 11.

As shown in FIG. 4, the back lid 15 has a long-by-narrow rectangular shape and a cross-sectionally triangular lower side, and the front surface thereof forms a long plate-shaped tape rear side covering surface 16 which together with a tape front side covering surface 23 of the front lid 19 covers the tape 41 exposed from the upper and lower shells 2 and 30. Lower shell guide projecting portions 17 which are guided by back lid guide groove 39 of the lower shell 30 to make the back lid 15 move so that it covers and uncovers the rear surface of the tape 41 are provided at rear corners of triangular lower sides of the ends of the back lid 15, and at the upper end of the tape rear side covering surface 16 the back lid 15 is barlike and has at both ends top lid engaging projecting portions 18 which engage with the back lid supporting portions 14 of the top lid 10.

As shown in FIG. 4, the front lid 19 is made up of a long-by-narrow platelike base plate 20, front lid side portions 21 provided at both ends of this base plate 20 and projecting in a direction orthogonal thereto, top lid engaging projecting portions 22 formed projecting from the ends of the top of the front lid 19 which engage with the top lid 10, and the tape front side covering surface 23 on the rear side of the base plate 20 which together with the back lid 15 covers the front side of the tape 41.

The front lid side portions 21 are made up of lid pivot shaft portions 23A, 23B of left-right differing structures having lid pivot shafts facing each other on the inner sides of the lid side portions 21, rectangular light path holes 24 and tonguelike lid locking projections 25 disposed further from the base plate 20 than the light path holes 24 in positions near the free end portions of the front lid side portions 21.

One lid pivot shaft portion 23A (on the left side in FIG. 4) is made up of a pivot shaft 26A which is rotatably engaged with the front lid pivot shaft receiving portion 5 of the upper shell 2 and a front lid pivot shaft engaging portion 34 of the lower shell 30, an urging shaft 27 provided on the extension axis of this pivot shaft 26A on which the twist coil spring 29 is mounted, and a second dustproofing rib part 28 formed in a position adjacent to this pivot shaft 26A in the shape of a right angle with a sloping lower side end portion.

The other lid pivot shaft portion 23B (on the right side in FIG. 4) is made up of a pivot shaft 26B which is rotatably engaged with the pivot shaft receiving portion 5 of the upper shell 2 and a front lid pivot shaft engaging portion 34 of the lower shell 30, and a second dustproofing rib part 28 formed in a position adjacent to this pivot shaft 26B in the shape of a right angle with a sloping lower side end portion.

As shown in FIG. 4, the twist coil spring 29 has a hollow coiled portion fitted onto the urging shaft 27 and although not shown in the drawings has one bent end portion restraining the front lid 19 and another bent end portion restraining the upper shell 2 and urges the lid mechanism 9 to close at all times.

Figure 5:
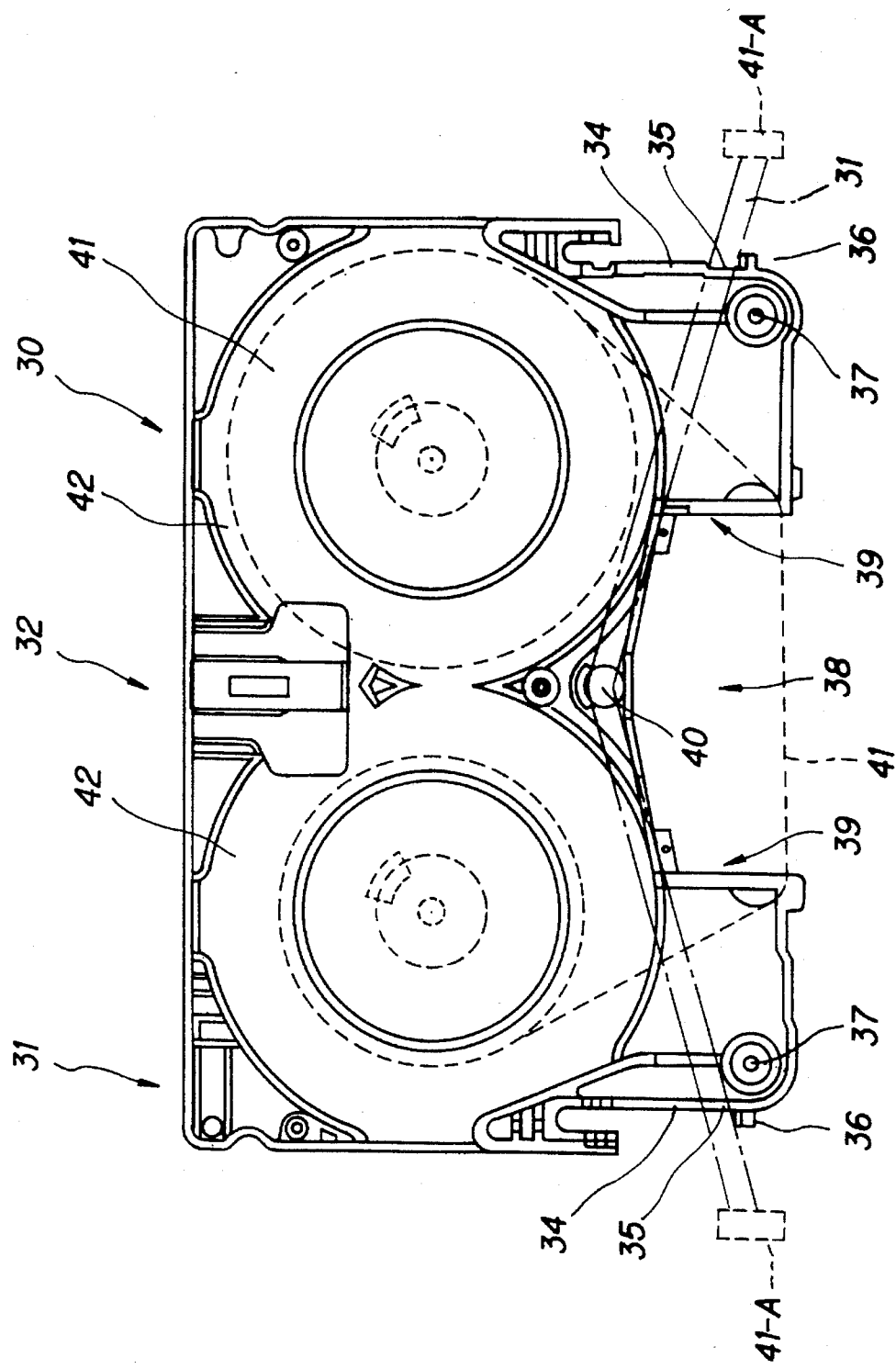
FIG. 5 is a plan view showing a lower shell of the same cassette with lid.

As shown in FIG. 4 and FIG. 5, the lower shell 30 is of a rectangular shape matching that of the upper shell 2 and is provided at a rear side corner thereof with an outer terminal connection portion 31 containing a solid state memory or the like, a reel locking mechanism part 32 disposed in a central position at the rear side, lid locking arms 33 disposed forward of central positions at both ends, front lid pivot shaft engaging portions 34, light path cutaway portions 35, first dustproofing rib parts 36 and upper shell engaging projections 37 provided near the corners at the front side, a light source insertion part 38 disposed in a front side central position and having a hole 40 for allowing the insertion of a light source from outside into the cassette 1 and back lid guide portions 39 in positions on the left and right of this light source insertion part 38. The lid locking arms 33 lock the lid locking projections 25 in the closed position of the lid mechanism 9 and prevent the lid mechanism 9 from being opened unintentionally.

The first dustproofing rib parts 36 are ribs for preventing dust and the like from entering through the light path cutaway portions 35 when the cassette 1 is not being used, and are formed in a right-angle shape projecting from the side walls of the lower shell 30. These first dustproofing rib parts 36 form U-shapes with the second dustproofing rib parts 28 provided on the front lid 19 described above and prevent the entry of dust and the like through the light path cutaway portions 35. The function of the first dustproofing rib parts 36 will be further discussed later.

This lower shell 30 has formed therein a light path 31 for detecting the ends of the tape 41 using a light beam. As shown in FIG. 5, when the cassette 1 is loaded into an electrical appliance or the like and the lid mechanism 9 opens, a light source of the electrical appliance is inserted from outside into the hole 40 of the light source insertion part 38. When this happens, light from this light source passes along the light path 31 through the tape 41 between the reels 42, through the light path cutaway portions 35 and reaches light detecting parts 41-A of the electrical appliance. As a result, when the tape 41 is completely taken up on one of the reels 42 and becomes a transparent tape beginning or end, light passes along the light path 31 and it can be easily determined that the tape 41 is at an end.

Assembly of the cassette with lid for recording and playback 1 thus made up of the various parts described above is carried out by first mounting the pair of reels 42 with the tape wound thereon in the lower shell 30. Then, the back lid 15 is engaged with the top lid 10 and the top lid 10 is engaged with the front lid 19 and assembly of the lid mechanism 9 itself is completed. Alternatively, the lid mechanism 9 may be assembled from the start.

Next, the lid mechanism 9 thus completed is engaged with the upper shell 2 and the lid mechanism 9 is made open and fitted to the lower shell 30 to complete the assembly of the cassette 1.

Figure 8:
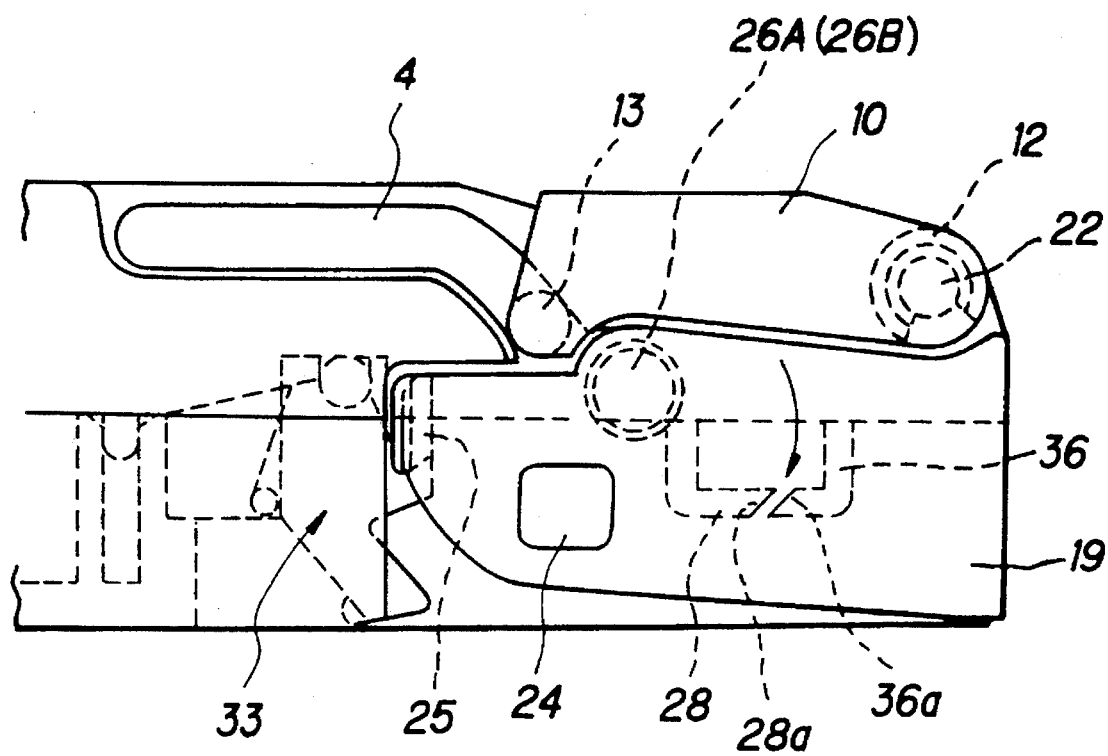
FIG. 8 is a view illustrating main parts of the lid mechanism in the closed state.

This step of making the lid mechanism 9 open and engaging it with the lower shell 30 will be described in detail with reference to FIG. 6, FIG. 7 and FIG. 8.

Figure 6:
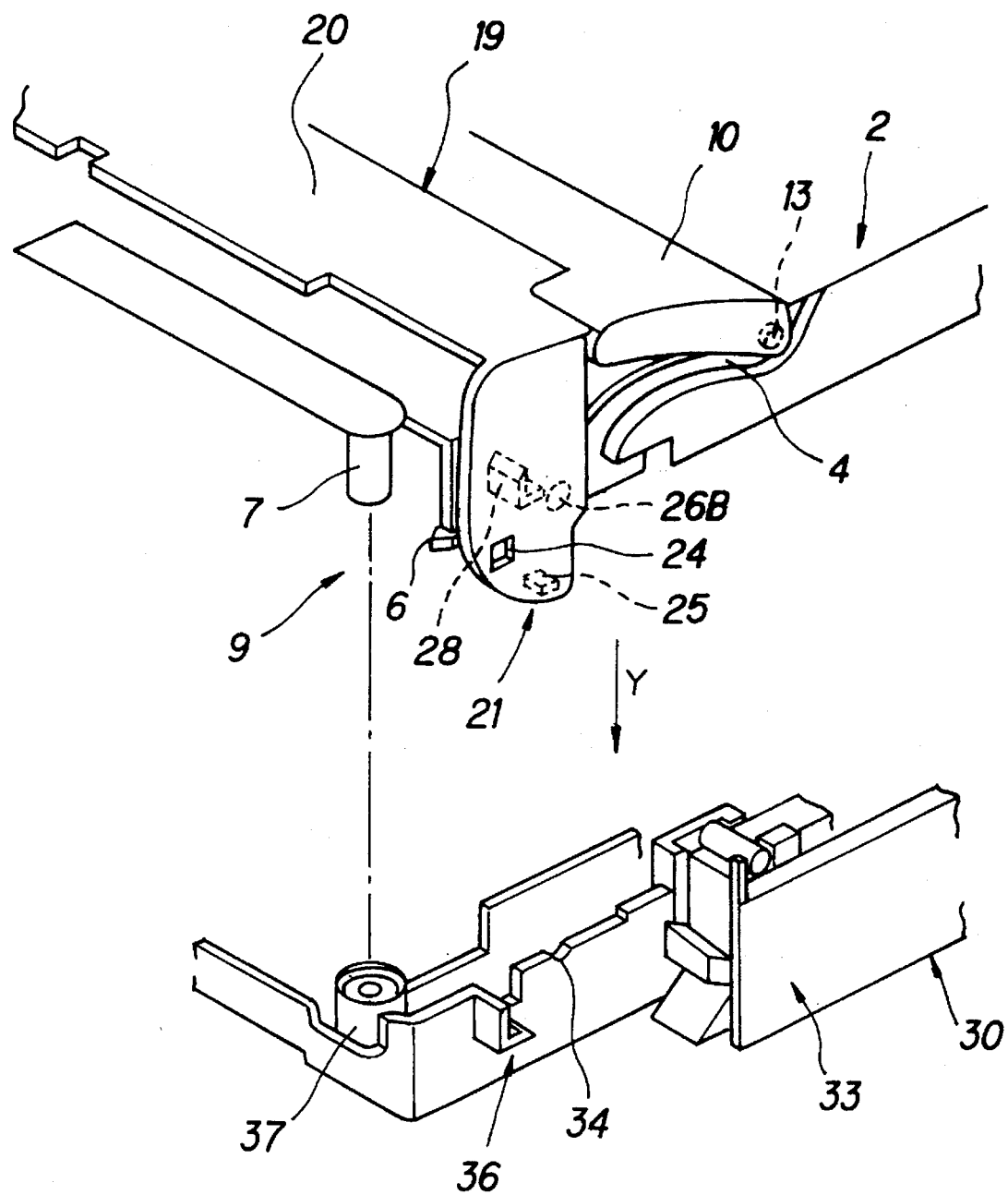
FIG. 6 is a main part enlarged perspective view illustrating a lid mechanism of an upper shell made open and engaged with the lower shell.
Figure 9:
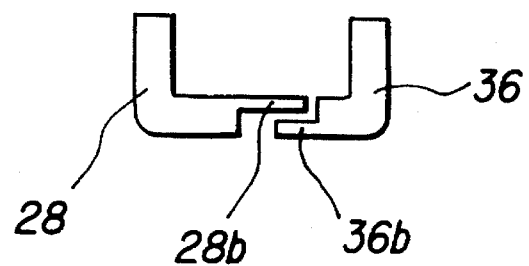
FIG. 9 is a detail view of a two-part dustproofing rib with a stepped labyrinth structure.

As shown in FIG. 6, by the lid mechanism 9 being pivoted upward about the pivot shafts 26B (26A) the upper shell engaging projecting portions 13 of the top lid 10 move upward guided by the top lid guide grooves 4, the tape rear side covering surface 16 of the back lid 15 and the tape front side covering surface 23 of the front lid 19 are made open and the lid mechanism 9 is moved in the Y direction and is engaged with the lower shell 30. At this time, as shown in FIG. 7, the second dustproofing rib parts 28 are in positions above the front lid pivot shaft engaging portions 34 of the lower shell 30 and the lid locking projections 25 are in lower side positions. That is, there is no obstruction in the width W through which the lid locking projections 25 of the front lid side portions 21 of the front lid 19 of the open lid mechanism 9 pass to the lower shell 30 side. As a result, when with the lid mechanism 9 open the upper shell 2 is engaged with the lower shell 30 from thereabove, it can be moved in the Y direction and engaged with the lower shell 30 directly as it is without being moved to the left or the right. As shown in FIG. 8, after the lid mechanism 9 is opened and the upper and lower shells 2 and 30 are engaged, when the lid mechanism 9 is made closed the second dustproofing rib parts 28 rotate in the direction of the arrow and sloping surfaces 36a and 28a of the right-angle portions of the first and second dustproofing rib parts 36, 28 come to face each other and the first and second dustproofing rib parts 36, 28 form U-shaped dustproofing ribs around the light path 31. At this time the second dustproofing ribs 28 are positioned near the pivot shafts 26A and 26B and the first dustproofing rib parts 36 are in positions further from the pivot shafts 26A and 26B than the second dustproofing rib parts 28. The sloping surfaces 36a, 28a of the first and second dustproofing rib parts 36,28 respectively become facing and when seen from outside form a blocking labyrinth structure and dust and the like does not easily enter. The labyrinth structure may alternatively be a labyrinth structure 28b, 36b of the kind shown in FIG. 9 comprising a step.

In this way, when the cassette 1 is being used, when the lid mechanism 9 is rotated upward about the pivot shaft 26A (26B), as shown in FIG. 7, the second dustproofing rib parts 28 provided on the front lid 19 also rotate upward, and the first and second dustproofing rib parts 36 and 28 are disposed so that the first dustproofing rib parts 36 do not interfere with this locus of rotation of the second dustproofing rib parts 28. The light path holes 24 rotate to the position of the light path 31 and it becomes possible to detect the ends of the tape from outside.

When the cassette is not being used, the lid mechanism 9 is closed about the pivot shafts 26A (26B) by the urging force of the twist coil spring 29, the first dustproofing rib parts 36 and the second dustproofing rib parts 28 block around the light path 31 and the entry of dust and the like is prevented.

As described above, in the dustproofing rib structure of a cassette with lid according to the invention, ribs provided around light holes for detecting the end of the tape are each split into two dustproofing rib parts and by these dustproofing rib parts being disposed in corresponding locations on the lower shell and the pivotal lid it is possible to secure a passing region as large as the width of the lid restraining member disposed at the free end of the rotatable lid mounted on the upper shell, the upper shell positioned above the lower shell and facing the lower shell can be engaged by a straight movement as it is without its direction being changed and the valuable benefit that assembly can be carried out extremely easily is achieved.

Also, by the facing surfaces of the dustproofing rib parts being made sloping in a labyrinth structure, when the rotatable rib parts are closed it is possible to prevent a there being gaps to the light hole between the sloping facing surfaces and the valuable effect that the entry of dust and the like can be prevented is achieved.

What is claimed is:

1. A tape cassette comprising:

a tape cassette case including upper and lower halves having a tape exposing portion at a front end and housing a pair of reels on which is wound a tape having transparent portions at a beginning and an end thereof;

a lid mounted on the front of the case pivotally about a shaft portion between a closed position wherein said lid covers the tape exposing portion and an open position wherein said lid exposes the tape exposing portion;

a pair of lid side portions provided at the ends of the lid;

a locking projection mounted on a lid side portion to the rear of the shaft portion for locking the lid in the closed position with a lid locking member;

said case having an opening in the vicinity of the shaft portion for guiding light from a light source for tape position detection to the outside; and a dustproofing rib disposed between the area of the case around the opening and the respective lid side portion, wherein the dustproofing rib includes a first rib part integrally formed on the case and a second rib part integrally formed on the respective lid side portion and said first and second rib parts do not physically engage one another when said respective lid side plate is moved with respect to said case.

2. A tape cassette according to claim 1 wherein the first rib part of the dustproofing rib is disposed on the lower half.

3. A tape cassette according to claim 2 wherein the first rib part of the dustproofing rib is disposed in a position wherein it does not interfere with movement of the locking projection when the lid is attached to the upper half in its open position and assembled to the lower half and does not interfere with the locus of movement described by the second rib part when the lid opens and closes.

4. A tape cassette according to claim 1 wherein facing surfaces of the first and second rib parts have a labyrinth structure.

5. A tape cassette according to claim 4 wherein the labyrinth structure is a pair of sloping surfaces provided on the facing surfaces of the first and second rib parts.

6. A tape cassette comprising:

a pair of reels on which is wound a tape having transparent parts at a beginning and an end thereof;

a case for housing the pair of reels formed by assembling together an upper half and a lower half;

a tape travel part where the tape between the pair of reels travels along the front of the case;

a lid, movable between a closed position, wherein said lid covers the tape, and an open position, wherein said lid exposes the tape, said lid being pivotally mounted on the front of the case and having a lid portion for covering the tape of the tape travel part and a pair of lid side portions provided at the ends of the lid portion;

a light source insertion aperture provided substantially in the center of the case through which a light source for tape position detection is inserted;

an opening provided in a side of the case facing the light source insertion aperture across the travel path of the tape;

said lid having a lid opening in a lid side portion thereof for aligning with the opening and guiding a light beam to the outside from said light source in the light source insertion aperture when the lid is in the open position; and a dustproofing rib provided between the area of the case around the opening and the lid side portion including a first rib part integrally formed on the case and a second rib part integrally formed on the lid portion and capable of blocking a gap between the case and the lid side portion around the opening with the first and second rib parts when the lid is closed and wherein said first and second rib parts do not physically engage one another when said respective lid side portion is moved with respect to said case.

* * * * *